US008942167B2

(12) United States Patent
Ankaiah et al.

(10) Patent No.: US 8,942,167 B2
(45) Date of Patent: Jan. 27, 2015

(54) METHODS, APPARATUS AND COMPUTER READABLE MEDIUM FOR SEAMLESS INTERNET PROTOCOL MULTICAST CONNECTIVITY IN UNIFIED NETWORKS

(75) Inventors: Shashi H. Ankaiah, Kallahalli Mandyn (IN); Seemant Choudhary, Fremont, CA (US); Udaya Shankar N., Bangalore (IN); Balachander Rajakondala, Hyderabad (IN)

(73) Assignee: Avaya Inc., Basking Ridge, NJ (US)

( * ) Notice: Subject to any disclaimer, the term of this patent is extended or adjusted under 35 U.S.C. 154(b) by 357 days.

(21) Appl. No.: 12/779,156

(22) Filed: May 13, 2010

(65) Prior Publication Data

US 2010/0290465 A1 Nov. 18, 2010

Related U.S. Application Data

(60) Provisional application No. 61/178,259, filed on May 14, 2009.

(51) Int. Cl.
| | |
|---|---|
| *H04W 4/00* | (2009.01) |
| *H04L 12/28* | (2006.01) |
| *H04L 12/46* | (2006.01) |
| *H04L 12/761* | (2013.01) |

(52) U.S. Cl.
CPC ........ *H04L 12/4633* (2013.01); *H04L 12/4641* (2013.01); *H04L 45/16* (2013.01)
USPC .......................................... 370/328; 370/389

(58) Field of Classification Search
USPC .......... 370/312, 331, 390, 400, 401, 328, 389
See application file for complete search history.

(56) References Cited

U.S. PATENT DOCUMENTS

| 6,839,348 | B2* | 1/2005 | Tang et al. ..................... 370/390 |
|---|---|---|---|
| 7,885,233 | B2* | 2/2011 | Nagarajan et al. ............ 370/331 |
| 8,018,900 | B2* | 9/2011 | Blanchette et al. ........... 370/331 |
| 8,200,546 | B2* | 6/2012 | White et al. ............... 705/26.25 |
| 8,300,614 | B2* | 10/2012 | Ankaiah et al. ............... 370/338 |
| 8,427,938 | B2* | 4/2013 | Atreya et al. ................. 370/217 |
| 8,428,021 | B2* | 4/2013 | Karunakaran et al. ........ 370/329 |
| 8,477,775 | B2* | 7/2013 | Choudhary et al. .......... 370/389 |
| 8,537,816 | B2* | 9/2013 | Anumala et al. ............. 370/389 |
| 8,555,312 | B2* | 10/2013 | Rahman ......................... 725/39 |
| 8,619,549 | B2* | 12/2013 | Narayana et al. ............. 370/217 |
| 2009/0034470 | A1* | 2/2009 | Nagarajan et al. ............ 370/331 |

* cited by examiner

*Primary Examiner* — Brian O'Connor
(74) *Attorney, Agent, or Firm* — Anderson Gorecki & Rouille LLP (57) ABSTRACT

A method, apparatus and computer program product for providing seamless Internet Protocol multicast connectivity in unified networks is presented. The systems disclosed herein are able to transfer, from a designated (i.e., first) VLAN to a roaming (i.e., second) VLAN, a multicast stream from a multicast server in a mobility VLAN that is not available at the roaming VLAN. In operation, example embodiments of the present invention receive a report identifying a roaming mobile unit as a member of a first VLAN and forward the report to a first mobility switch in the first VLAN. The multicast stream is then received and forwarded toward the roaming mobile unit in the second VLAN so that transfer of the multicast stream from the first VLAN to the second VLAN is seamless.

18 Claims, 7 Drawing Sheets

FIG. 1

200 RECEIVE A REPORT IDENTIFYING A ROAMING MOBILE UNIT AS A MEMBER OF A FIRST VIRTUAL LOCAL AREA NETWORK (VLAN), NOT AVAILABLE AT A SECOND VLAN, AND CONFIGURED TO RECEIVE A MULTICAST STREAM AS PART OF A MULTICAST GROUP FROM A MULTICAST SERVER IN THE FIRST VLAN

204 RECEIVE THE REPORT FROM AN ACCESS POINT IN THE SECOND VLAN, IN REPLY TO A QUERY TRANSMITTED FROM THE ACCESS POINT SENT IN RESPONSE TO A REQUEST FROM THE ROAMING MOBILE UNIT TO ASSOCIATE WITH THE ACCESS POINT, OVER AN ACCESS TUNNEL CONSTRUCTED TO THE ACCESS POINT

205 EXAMINE THE REPORT TO IDENTIFY THE FIRST VLAN AS A VLAN FROM WHICH THE ROAMING MOBILE UNIT HAS ROAMED

206 UPDATE A MULTICAST FORWARDING DATABASE (MFDB) TO INCLUDE AN ENTRY FOR THE ROAMING MOBILE UNIT

201 FORWARD THE REPORT TO A FIRST MOBILITY SWITCH IN THE FIRST VLAN, IDENTIFIED IN THE REPORT, OVER A MOBILITY TUNNEL CONSTRUCTED TO THE FIRST MOBILITY SWITCH IN THE FIRST VLAN

207 FORWARD THE REPORT, ACCORDING TO THE ENTRY FOR THE ROAMING MOBILITY UNIT IN THE UPDATED MFDB IDENTIFYING THE FIRST MOBILITY SWITCH IN THE FIRST VLAN AS A VLAN SERVER FOR THE FIRST VLAN, OVER THE MOBILITY TUNNEL CONSTRUCTED TO THE FIRST MOBILITY SWITCH IN THE FIRST VLAN

208 UPDATE A MFDB AT THE FIRST MOBILITY SWITCH TO INCLUDE THE MOBILITY TUNNEL CONSTRUCTED TO THE FIRST MOBILITY SWITCH

209 FORWARD THE REPORT FROM THE FIRST MOBILITY SWITCH IN THE FIRST VLAN TO A MULTICAST ROUTER IN THE FIRST VLAN

METHODS, APPARATUS AND COMPUTER READABLE MEDIUM FOR SEAMLESS INTERNET PROTOCOL MULTICAST CONNECTIVITY IN UNIFIED NETWORKS

CROSS REFERENCE TO RELATED APPLICATIONS

The present application claims the benefit of U.S. Provisional Patent Application No. 61/178,259, filed on May 14, 2009, which is incorporated herein by reference in its entirety.

BACKGROUND

Wireless Local Area Networks (LANs) are a popular and inexpensive way to allow multiple users of "mobile units" (MUs) to communicate with each other, to access a wired LAN, to access a local server, to access a remote server, such as over the Internet, etc. Wireless LANs are employed within facilities such as businesses, university classrooms or buildings, airport lounges, hotel meeting rooms, etc. When a user is physically located in the vicinity of an access point, the transceiver of the mobile unit communicates with the access point and a connection to the wireless LAN is established.

A LAN may also include one or more Virtual Local Area Networks (VLANs). A VLAN includes a group of devices with a common set of requirements that communicate as if they were attached to the same broadcast domain, regardless of their physical location. A VLAN has the same attributes as a physical LAN, but allows for devices to be grouped together even if they are not located on the same network switch. Conventional VLANs were statically configured on wired networks using the Institute of Electrical and Electronics Engineers (IEEE) 802.1Q networking standard. Typically, Virtual Local Area Networks (VLANs) are governed by a set of policies relating to network security, user permissions and the like.

Wireless LANs may allow a mobile unit to send/receive an Internet Protocol (IP) multicast stream. IP multicast is a technique for one-to-many communication over an IP infrastructure in a network. IP multicast is widely deployed in enterprises, commercial stock exchanges, and multimedia content delivery networks. A common enterprise use of IP multicast is for IPTV applications such as distance learning and televised company meetings. It scales to a larger receiver population by not requiring prior knowledge of who or how many receivers there are. Multicast uses network infrastructure efficiently by requiring the source to send a packet only once, even if it needs to be delivered to a large number of receivers. Internet Protocol networks use the Internet Group Management Protocol (IGMP) to support efficient multicast. Multicast streams are destined to multicast group IP addresses and are replicated by multicast router nodes only on those downstream ports where a receiver(s) has requested to join the multicast stream.

IGMP snooping is a mechanism used by Layer 2 switching nodes in the network to optimize the flow of multicast traffic within a broadcast domain. IGMP snooping operates on a switch by snooping the IGMP protocol's multicast group join and leave requests from multicast receivers downstream per Virtual Local Area Network (VLAN). IGMP join and leave requests are sent by the receivers based on periodic queries from the upstream IGMP multicast routers or IGMP proxy queriers based on protocol timers. IGMP snooping switches do not initiate these queries by themselves. Multicast traffic for a specific multicast group is forwarded to only those downstream ports where a snooping switch has detected the receiver for the multicast group from the snooped IGMP messages.

SUMMARY

A mobility domain is a single geographic area where a same set of mobility services are provided, such as a campus, site or any single geographic region where the same mobility services (e.g., policies, VLANs, etc.) are desired. A mobility domain may comprise tens of wireless controllers, hundreds of mobility switches, thousands of wireless access points and tens of thousands of mobile units. Mobile units may include laptops, cell phones, Personal Digital Assistants (PDAs), wireless Voice over Internet Protocol (VoIP) telephones and the like. A mobility domain can span across multiple wireless access points to provide the interface between the wireless medium and the wired medium. Mobility switches provide connectivity between the wired domain and the wireless domain. Wireless controllers configure and manage the various components of the mobility domain using various mobility domain control protocols. A mobility domain provides similar network services to the network users solely based on user credentials and independent of the device (wired or wireless) used to access the network services.

A mobility domain is segmented into multiple virtual broadcast domains by extending the Virtual Local Area Network (VLAN) concept that exists in the wired domain to the entire mobility domain, referred to as Mobility VLANs. Mobility VLANs are identified by name that is unique within the entire mobility domain and are mapped to the conventional wired VLANs at mobility switches. The mapping allows unification of the mobility VLAN and wired VLAN into a single virtual broadcast domain. A mobility switch that maps a mobility VLAN to a wired VLAN also may advertise this mapping to peer mobility switches. In this case the mobility switch is said to be a "server" of the mobility VLAN; the peers that do not have the mapping may be the "clients" for the mobility VLAN. Mobile units may be assigned to a mobility VLAN.

Wireless users are assigned to mobility VLANs based on the credentials or the wireless network with which they associate. When a wireless user roams across the mobility domain, the access to its mobility VLAN is maintained by the network via the mobility switch that provides the "service" for its mobility VLAN. Because the wireless user maintains access to its mobility VLAN, it is able to retain access to its IP subnet no matter where it roams in the mobility domain.

However, IP multicast streaming in a roaming environment suffers from additional drawbacks that are not solved by maintaining access to the mobility VLAN for the wireless user alone. For example, multicast streaming optimization on the mobility VLAN may require Internet Group Management Protocol (IGMP) snooping support on the mobility switches. When IGMP snooping is enabled on the mobility VLAN, the mobility switches may snoop the IGMP protocol messages between the wireless users and the upstream IGMP multicast routers or multicast servers. The mobility switches build multicast group memberships based on the snooped messages. When a wireless user that is receiving or transmitting a multicast stream roams, its multicast group membership may be updated immediately within the mobility domain wherever the wireless user roams to ensure that the multicast stream is not disrupted.

Example embodiments of the present invention substantially overcome these and other deficiencies and provide methods, apparatus and a computer readable medium that provide seamless IP multicast stream transfer. In other words, the systems disclosed herein are able to maintain optimized transmission/reception of a multicast stream from/to a wireless user at times IGMP snooping is enabled on the mobility VLAN assigned to the wireless user and the wireless user roams across mobility switches in a mobility domain.

In operation, example embodiments of the present invention receive a report identifying a roaming mobile unit as a member of a mobility VLAN that is not providing service locally (i.e., at a local VLAN). The roaming mobile unit is configured to, for example, receive a multicast stream as part of a multicast group from a multicast server in the mobility VLAN. The report is then forwarded to a first mobility switch (i.e., a VLAN server mobility switch), acting as a VLAN server in a first local VLAN (i.e., a designated/server VLAN) from which the mobile unit roamed, identified in an advertisement sent over a mobility tunnel constructed to the VLAN server mobility switch. The multicast stream is then received over the mobility tunnel from the VLAN server mobility switch and forwarded toward the roaming mobile unit in a second local VLAN (i.e., a roaming/client VLAN) to which the mobile unit roamed (e.g., to an access point in the roaming/client VLAN of the mobility VLAN over an access tunnel constructed to the access point) so that transfer of the multicast stream from the designated VLAN to a roaming VLAN, is seamless. An access tunnel may be constructed between each mobility switch and access points connected to the mobility switch.

In certain example embodiments, the report identifying the roaming mobile unit is received from an access point in the roaming VLAN, in reply to a query transmitted from the access point sent in response to a request from the roaming mobile unit to associate with the access point, over an access tunnel constructed to the access point. The report may be examined to identify the designated VLAN as a VLAN from which the roaming mobile unit has roamed. A multicast forwarding database (MFDB) is then updated accordingly to include an entry for the roaming mobile unit. Query messages generated by the multicast server in the mobility VLAN may be received through the mobility tunnel constructed to the VLAN server mobility switch and forwarded to an access point in the roaming VLAN.

Further, the report may be forwarded according to the entry for the roaming mobile unit in the updated MFDB identifying the VLAN server mobility switch in the designated VLAN as a VLAN server for the designated VLAN, over the mobility tunnel constructed to the VLAN server mobility switch. A MFDB at the VLAN server mobility switch then may be updated to include the mobility tunnel constructed to the VLAN server mobility switch. Next, the report may be forwarded from the VLAN server mobility switch to a multicast router in the mobility VLAN.

In still other example embodiments in which a plurality of mobility switches is provided, for each mobility switch, a mobility tunnel may be constructed to each other mobility switch in the plurality of mobility switches such that each mobility switch is connected to each respective other mobility switch in form of a mesh network of mobility tunnels. For a mobility switch in the plurality of mobility switches and in response to advertisements broadcast on the mesh network of mobility tunnels identifying mobility switches as VLAN server mobility switches for respective VLANs, each respective other mobility switch in the plurality of mobility switches may be recorded as a potential VLAN server in its respective local VLAN.

In failover situations, failure in the mobility tunnel to the VLAN server mobility switch may be detected. The roaming mobility switch may fail over to a second mobility switch in the designated VLAN (i.e., an alternate VLAN server mobility switch) as an alternate VLAN server for the mobility VLAN. Accordingly, reports may be forwarded to the alternate VLAN server mobility switch over an alternate mobility tunnel constructed to the alternate VLAN server mobility switch. An MFDB at the alternate VLAN server mobility switch may be updated to include the alternate mobility tunnel constructed to the alternate VLAN server mobility switch. Thus, the multicast stream may be received over the alternate mobility tunnel from the alternate VLAN server mobility switch.

Other example embodiments include a computerized device (e.g., a client/roaming mobility switch), configured to process all the method operations disclosed herein as embodiments of the invention. In such embodiments, the computerized device includes a memory system, a processor, communications interface in an interconnection mechanism connecting these components. The memory system is encoded with a process that provides seamless IP multicast connectivity as explained herein that, when performed (e.g., when executing) on the processor, operates as explained herein within the computerized device to perform all of the method embodiments and operations explained herein as embodiments of the invention. Thus any computerized device that performs or is programmed to perform the processing explained herein is an embodiment of the invention.

Other embodiments include a computer readable medium having computer readable code thereon for providing seamless IP multicast connectivity. The computer readable medium includes instructions that, when performed (e.g., when executing) on a processor in a computerized device, cause the computerized device to operate as explained herein to perform all of the method embodiments and operations explained herein as embodiments of the invention. Thus any computer readable medium that is encoded with instructions to perform the processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing seamless IP multicast connectivity as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Avaya Inc. of Lincroft, N.J.

Note that each of the different features, techniques, configurations, etc. discussed in this disclosure can be executed independently or in combination. Accordingly, the present invention can be embodied and viewed in many different ways. Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
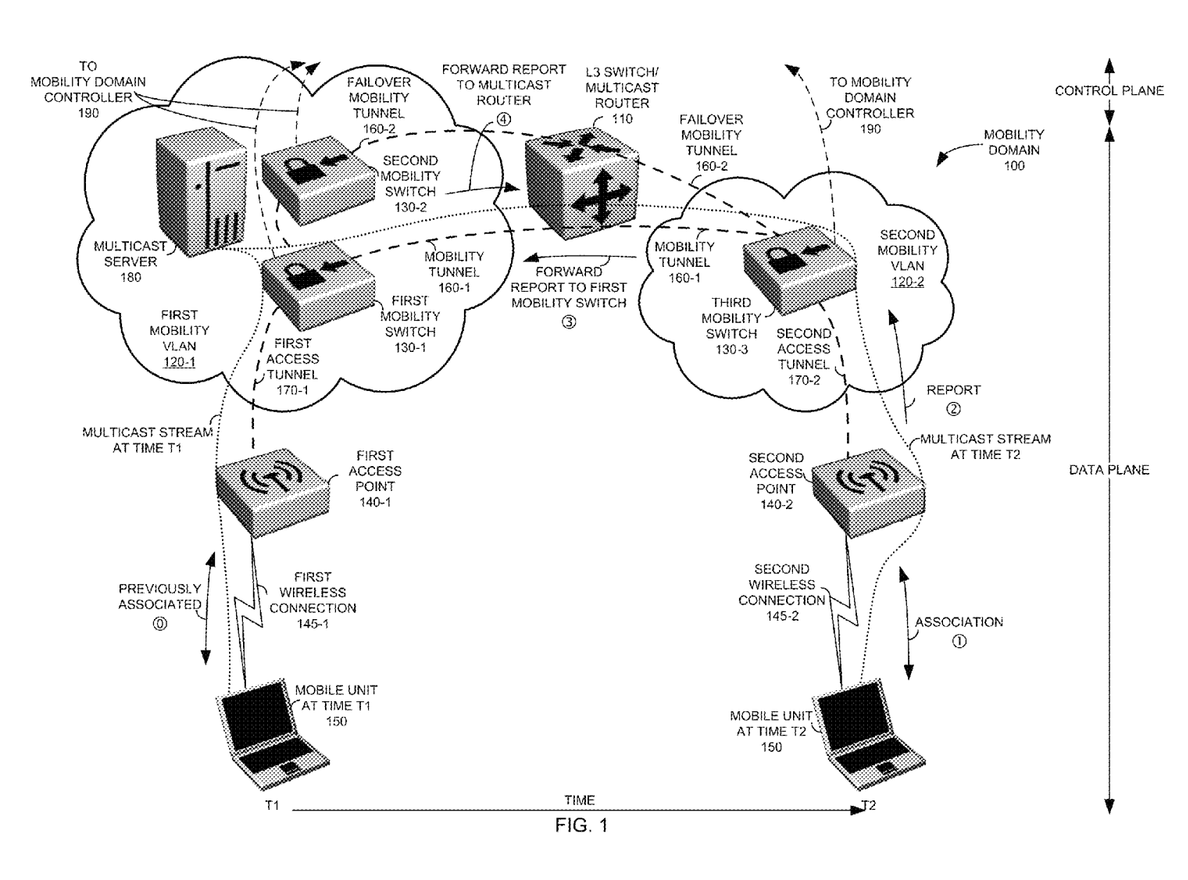
FIG. 1 is a diagram illustrating an example embodiment of the present invention showing a mobile unit, over time, roaming in a mobility Virtual Local Area Network (Mobility VLAN) from a first VLAN (i.e., designated VLAN) to a second VLAN (i.e., roaming VLAN) and seamless transfer of multicast connectivity provided in the mobility VLAN.

FIG. 1 is a diagram illustrating a mobility domain 100. This example mobility domain 100 includes three mobility switches 130: a VLAN server mobility switch 130-1 (i.e., a first mobility switch), an alternate VLAN server mobility switch 130-2 (i.e., a second mobility switch) and a roaming mobility switch 130-3 (i.e., a third mobility switch). Each mobility switch 130 is connected at the network layer (i.e., Layer 3) via a Layer 3 switch/multicast router 110 and provides access to two local Virtual Local Area Networks (VLANs), respectively: a designated VLAN (i.e., a first local VLAN) 120-1 and a roaming VLAN (i.e., a second local VLAN) 120-2. In this example embodiment, the VLAN server mobility switch (i.e., the first mobility switch) 130-1 and the alternate VLAN server mobility switch (i.e., the second mobility switch) 130-2 are in the designated VLAN 120-1 and the roaming mobility switch (i.e., the third mobility switch) 130-3 is in the roaming VLAN 120-2.

As illustrated, a mobility VLAN 125 is mapped to the designated VLAN 120-1 at time T1 on the VLAN server mobility switch 130-1 and the alternate VLAN server mobility switch 130-2, which are configured as servers for the mobility VLAN 125. Note that, at time T1, the mobility VLAN 125 is not mapped to the roaming VLAN 120-2 at the roaming mobility switch 130-3. As will be described below, the roaming mobility switch 130-3 marks the VLAN server mobility switch 130-1 and the alternate VLAN server mobility switch 130-2 as VLAN servers for the mobility VLAN 125. The roaming mobility switch 130-3 uses one of the VLAN server mobility switch 130-1 and the alternate VLAN server mobility switch 130-2 to forward traffic to roaming mobile units, that are in the roaming VLAN 120-2 and members of the mobility VLAN 125, based on a priority of the VLAN servers 130-1, 130-2.

Mobility tunnels 160 are constructed between the mobility switches 130. In this example embodiment, the mobility tunnels 160 include a mobility tunnel 160-1 constructed between the VLAN server mobility switch 130-1 in the designated VLAN 120-1 and the roaming mobility switch 130-3 in the roaming VLAN 120-2 and an alternate mobility tunnel 160-2 constructed between the alternate VLAN server mobility switch 130-2 in the designated VLAN 120-1 and the roaming mobility switch 130-3 in the roaming VLAN 120-2. Although only three mobility switches 130-1, 130-2, 130-3 are shown, it should be understood that a mobility domain (e.g., mobility domain 100) may include hundreds of mobility switches 130. In such an arrangement, the mobility switches 130 are interconnected in a mesh network by a plurality of mobility tunnels 160 constructed between each mobility switch 130. According, a further mobility tunnel constructed between the VLAN server mobility switch 130-1 and the alternate VLAN server mobility switch 130-2 in the designated VLAN 120-1 is shown. As will be described below, the mobility tunnel 160-1 and the alternate mobility tunnel 160-2, respectively, allow data flow between the VLAN server mobility switch 130-1 and the alternate VLAN server mobility switch 130-2 in the designated VLAN 120-1 and the roaming mobility switch 130-3 in the roaming VLAN 120-2 for a roaming mobile unit 150.

The example mobility domain 100 also includes two access points: a first access point 140-1 in the designated VLAN 120-1 and a second access point 140-2 in the roaming VLAN 120-2. A first access tunnel 170-1 is constructed between the VLAN server mobility switch 130-1 and the first access point 140-1. Likewise, a second access tunnel 170-2 is constructed between the roaming mobility switch 130-3 and the second access point 140-2. The access tunnels 170 provide connectivity between the mobility switches 130 and their respective access points 140.

The first access point 140-1 provides connectivity to the designated VLAN 120-1 over a first wireless connection 145-1 to the mobile unit 150 at time T1. Similarly, the second access point 140-2 provides connectivity to the roaming VLAN 120-2 over a second wireless connection 145-2 to the roaming mobile unit 150 at time T2. As will be described below, the roaming mobile unit 150 is also provided connectivity to the mobility VLAN 125 at time T2 via the mobility tunnel 160-1 between the VLAN server mobility switch 130-1 and the roaming mobility switch 130-3, and the second access tunnel 170-2 between the second access point 140-2 and the roaming mobility switch 130-3. Similarly, during times in which the mobility tunnel 160-1 experiences a failure or is unavailable for any other reason, such as a failure of the VLAN server mobility switch 130-1, the roaming mobile unit 150 is provided connectivity to the mobility VLAN 125 at time T2 via the alternate mobility tunnel 160-2 constructed between the alternate VLAN server mobility switch 130-2 and the roaming mobility switch 130-3, and the second access tunnel 170-2 between the second access point 140-2 and the client/roaming mobility switch 130-3.

Each mobility switch 130 includes a mobility agent (not shown) that, respectively, communicates with a wireless controller (not shown) using a Control and Provisioning of Wireless Access Points (CAPWAP)-like interface. Further, for example, a mobility agent in a mobility switch 130 communicates with mobility agents in other mobility switches 130 and with access points 140 using data plane protocols.

Accordingly, the mobility domain 100 architecture supports roaming of mobile units 150 across mobility switches 130. Such mobility allows mobile units 150 to move within the mobility domain 100 and still access network services. In an idle mode, mobility sessions must be reestablished at a new location. Conversely, in an in-session mode, mobile units 150 may move while maintaining their current session. The mobile units 150 retain their Internet Protocol (IP) address in both intra-subnet and inter-subnet roaming scenarios. The mobile units 150 also retain their membership to the mobility VLAN 125 they have been assigned (i.e., designated VLAN), even during roaming scenarios (e.g., in roaming VLANs). This provides seamless mobility and constrains network delays and packet losses caused by roaming.

Although only three mobility switches 130 are shown, it should be understood that a mobility domain (e.g., mobility domain 100) may include hundreds of mobility switches 130. In such an arrangement, the mobility switches 130 are interconnected in a mesh network by a plurality of mobility tunnels 160 constructed between each mobility switch 130. Likewise, although only two access points 140 are shown, thousands of access points 140 may be included in a mobility domain 100, with plural access points 140 connected to a particular mobility switch 130 over access tunnels 170. Similarly, although only one mobile unit 150 is shown, there may be tens of thousands of mobile units 150 roaming among the plurality of access points 140 connected to various mobility switches 130 providing connectivity to the mobility VLAN 125. Example mobile units 150 include laptop computers, cellular telephones, Personal Digital Assistants (PDAs) and the like. This architecture is discussed in further detail in copending U.S. patent application Ser. No. 12/775,026, filed May 6, 2010, Ser. No. 12/765,402, filed Apr. 22, 2010 and Ser. No. 12/776,897, filed May 10, 2010, which are herein incorporated by reference.

Various protocols are used in the data plane of the mobility domain 100. The protocols in the data plane can be broadly classified into two categories: Tunnel Protocols, and the Mobility VLAN Management Protocol (MVMP). The tunnel protocols are used to set up, maintain and teardown tunnels (e.g., mobility tunnels 160 and access tunnels 170, generally) in the data plane and offer control and data packet transfer services to other layers in the system.

Access Tunnel Protocol (ATP) is used to set up and manage access tunnels 170 constructed between mobility switches 130 and access points 140 connected thereto. An Access Tunnel Protocol client resides on the access point 140 and an Access Tunnel Protocol server resides on the mobility switch 130.

Mobility Tunnel Protocol (MTP) is used to set up and manage the mobility tunnels 160 constructed between peer mobility switches 130 in the mobility domain 100. The Mobility Tunnel Protocol components (i.e., client and server) both reside on the mobility switches 130.

Mobility VLAN Management Protocol (MVMP) provides a framework for mobility switches 130 to advertise the mobility VLANs 125 they support to their peer mobility switches 130 in the mobility domain 100 and also their capability to act as mobility VLAN servers for those mobility VLANs 125 for election by the peer mobility switches 130. The MVMP components (i.e., client and server) both run on access points 140 and mobility switches 130. MVMP runs over a control channel offered by the respective tunnel protocol (i.e., ATP for access tunnels 170 and MTP for mobility tunnels 160) and provides VLAN management services on the access tunnels 170 and mobility tunnels 160. The MVMP protocol supports the mobility VLAN membership management capabilities, thereby allowing access points 140 and peer mobility switches 130 to request a mobility switch 130 add mobility VLANs 125 to the tunnels 160 they share. MVMP is discussed in further detail in copending U.S. patent application Ser. No. 12/775,816, filed May 7, 2010, which is herein incorporated by reference.

The example embodiment of FIG. 1 will be discussed further in conjunction with the flow diagrams of FIGS. 2-3.

Figure 2A:
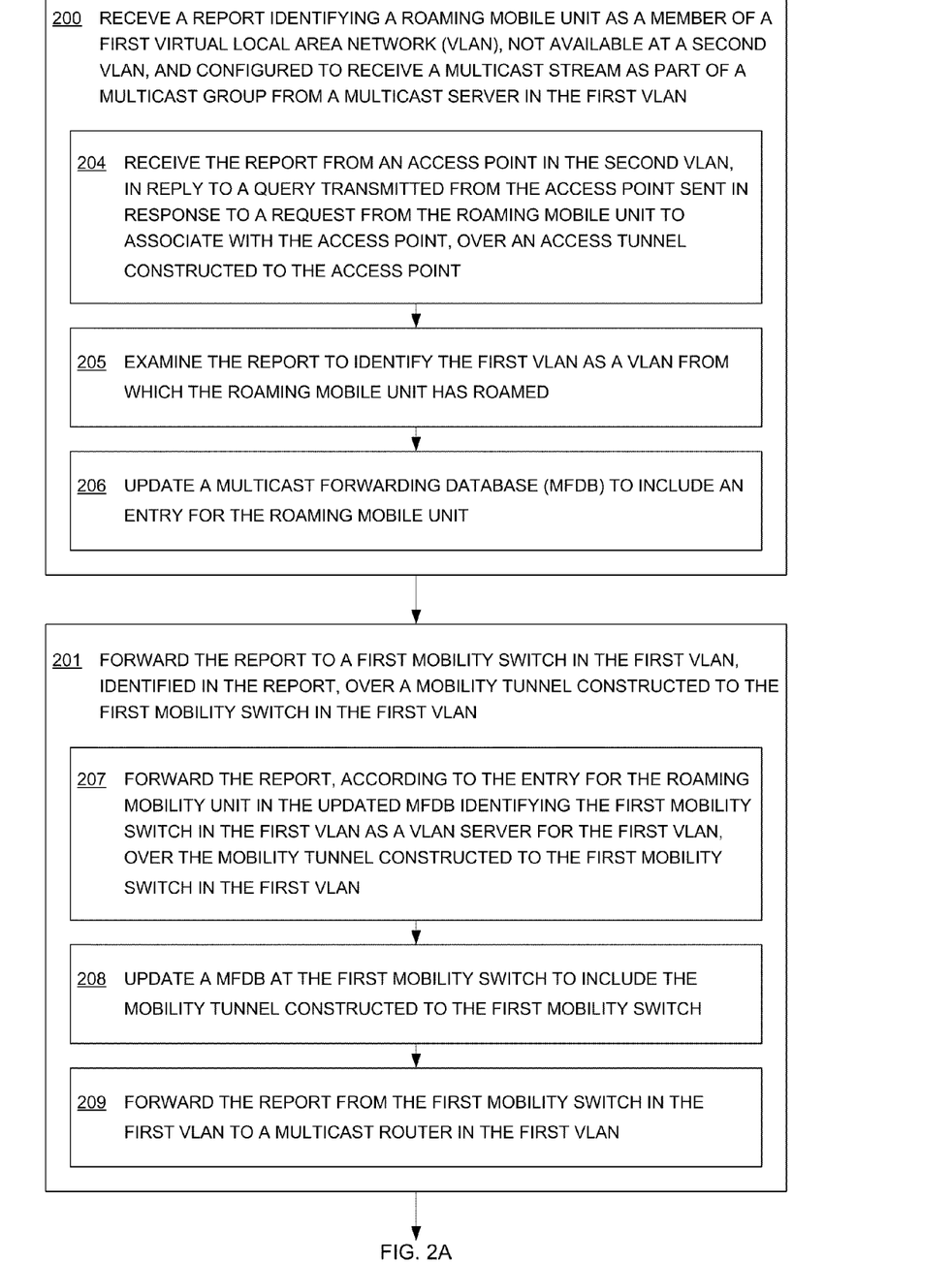
FIGS. 2A-2B are a flow diagram illustrating the steps performed by a mobility switch for providing seamless multicast connectivity according to an example embodiment of the present invention.
Figure 2B:
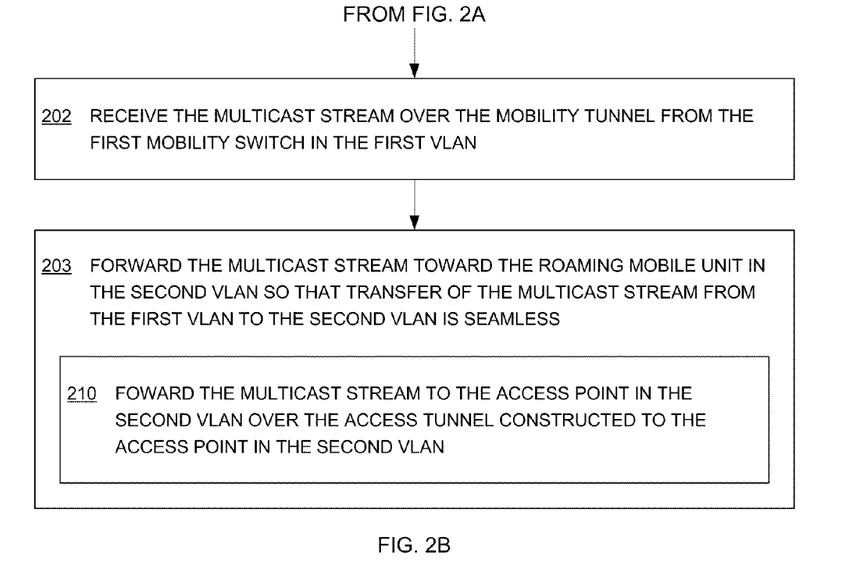

FIGS. 2A-2B are a flow diagram illustrating the steps performed by a mobility switch 130 for providing seamless multicast connectivity according to an example embodiment of the present invention. As illustrated in the example embodiment of FIG. 1, at time T1, the mobile unit 150 is subscribed to a multicast stream as a member of a multicast group served by a multicast server 180 in the mobility VLAN 125. It should be understood, however, that in other example embodiments, the mobile unit 150, itself, may be a multicast server providing a multicast stream to other mobile units (or any node). The mobile unit 150, at time T1, is previously associated with the first access point 140-1 over the first wireless connection 145-1 with connectivity to the server VLAN 120-1 provided by the first access tunnel 170-1.

As time progresses from time T1 to time T2, the roaming mobile unit 150 roams to the second access point 140-2 and attempts to associate wirelessly with the second access point 140-2 in the roaming VLAN 120-2. Note that the mobility VLAN 125 is not initially available in the roaming VLAN 120-2. The roaming mobility switch 130-3 then receives a report identifying the roaming mobile unit 150 as a member of the mobility VLAN 125 (i.e., served by the designated VLAN 120-1 and not served locally at the roaming mobility switch 130-3 in the roaming VLAN 120-2) and configured to receive the multicast stream as part of the multicast group served by the multicast server 180 in the mobility VLAN 125 (200). For example, the roaming mobility switch 130-3 may receive the report from the second access point 140-2 in reply to a query transmitted from the second access point 140-2 sent in response to a request from the roaming mobile unit 150 to associate with the second access point 140-2, over an a second access tunnel 170-2 constructed to the second access point 140-2 (204). The roaming mobility switch 130-3 may then examine the report to identify the roaming mobile unit as a member of the mobility VLAN 125 and having roamed from the designated VLAN 120-1 (205). The report may also identify the VLAN server mobility switch 130-1 in the designated VLAN 120-1 as the VLAN server for the mobility VLAN 125. The roaming mobility switch 130-3 then updates a multicast forward database (MFDB) to include an entry for the roaming mobile unit 150 (206).

However, as illustrated in FIG. 1 and stated above, the roaming mobility switch 130-3 does not provide connectivity to the mobility VLAN 125 (i.e., the roaming mobility switch 130-3 provides connectivity to the roaming VLAN 120-2). Accordingly, the roaming mobility switch 130-3 forwards the report to the VLAN server mobility switch 130-1, identified in the report, over the mobility tunnel 160-1 constructed to the VLAN server mobility switch 130-1 (201). For example, the roaming mobility switch 130-3 may forward the report, according to the entry for the roaming mobile unit 150 in the updated MFDB identifying the VLAN server mobility switch 130-1 as a VLAN server for the designated VLAN 120-1, over the mobility tunnel 160-1 constructed to the VLAN server mobility switch 130-1 (207). The VLAN server mobility switch 130-1 may then update a MFDB at the VLAN server mobility switch 130-1 to include the mobility tunnel 160-1 constructed to the VLAN server mobility switch 130-1 (208) and forward the report from the VLAN server mobility switch 130-1 to the multicast router 110 in the mobility VLAN 125 (209).

The roaming mobility switch 130-3 then receives the multicast stream over the mobility tunnel 160-1 from the VLAN server mobility switch 130-1 (202). The roaming mobility switch 130-3 then forwards the multicast stream toward the roaming mobile unit 150 in the roaming VLAN 120-2 so that transfer of the multicast stream from the designated VLAN 120-1 to the roaming VLAN 120-2 is seamless (203). The roaming mobility switch 130-3 may do this by forwarding the multicast stream to the second access point 140-2 over the second access tunnel 170-2 constructed to the second access point 140-2 (210). These steps will be described below in greater detail with regard to the flow diagram of FIG. 6.

Mobility VLANs 125 are identified by a name that is unique in the mobility domain 100, similar to how traditional VLANs 120 are identified by an identifier. Accordingly, both a mobility VLAN name and a VLAN identifier are assigned to a mobile unit 150, with the mobility VLAN 125 mapped to a local (i.e., static) VLAN 120 on mobility switches 130. The mobility VLAN ID (MVID) is a map of the mobility VLAN name to a unique ID on this side of the mobility domain 100. The configured mobility VLAN names are mapped to VLAN IDs in the local address space. This can use a standard VLAN address space. The VLAN address space is used to map a mobility VLAN name to a VLAN number, and this number is passed back to the second access point 140-2. MVIDs are discussed in further detail in copending U.S. patent application Ser. No. 12/777,028, filed May 10, 2010, which is herein incorporated by reference.

When a mobile unit 150 roams to a mobility switch 130 on which a local mapping (i.e., association) for the mobility VLAN 125 is not available, packets transmitted to or received from it need to be tunneled to/from its VLAN server. Thus, mobility switches 130 in a mobility domain 100 need to be aware of the possible mobility VLAN servers for the various mobility VLANs 125 in the mobility domain 100.

Figure 3:
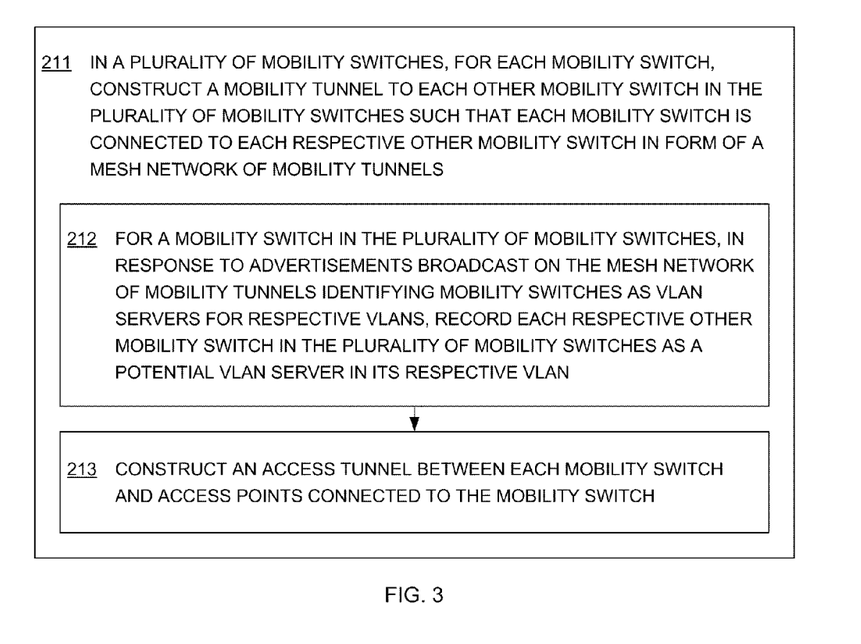
FIG. 3 is a flow diagram illustrating the steps performed by a mobility switch for constructing a mesh network of mobility tunnels to each other mobility switch in a plurality of mobility switches and access tunnels to access points connected to the mobility switch.

FIG. 3 is a flow diagram illustrating the steps performed by a mobility switch 130 for constructing a mesh network of mobility tunnels 160 to each other mobility switch 130 in a plurality of mobility switches 130, and access tunnels 170 to access points 140 connected to the mobility switch 130. For purposes of illustration, the discussion below will focus on the VLAN server mobility switch 130-1 and the mobility tunnels and access tunnels 170 constructed from it. However, it should be understood that the discussion is applicable equally to each of the three mobility switches 130-1, 130-2, 130-3 illustrated and other mobility switches 130 that may be present in the mobility domain 100 in other example embodiments.

As illustrated in FIG. 1, there is a plurality of three mobility switches 130-1, 130-2, 130-3. The VLAN server mobility switch 130-1 constructs a mobility tunnel 160 to each other mobility switch 130 (e.g., the mobility tunnel 160-1 to the roaming mobility switch 130-3 and a mobility tunnel to the alternate VLAN server mobility switch 130-2) in the plurality of mobility switches. This process occurs at each mobility switch 130 so that, once complete, each mobility switch 130 is connected to each respective other mobility switch 130 in form of a mesh network of mobility tunnels 160 (211). In response to advertisements broadcast on the mesh network of mobility tunnels 160 identifying mobility switches 130 as VLAN servers for respective mobility VLANs 125, the VLAN server mobility switch 130-1 records each respective other mobility switch 130 (e.g., the alternate VLAN server mobility switch 130-2 and the roaming mobility switch 130-3) in the plurality of mobility switches 130 as a potential VLAN server in its respective local VLAN 120 (e.g., the designated VLAN 120-1 and the roaming VLAN 120-2, respectively) to determine which mobility switches 130 may act as VLAN servers for particular mobility VLANs 125 (212). Each access point 140 then constructs an access tunnel 170 to each mobility switch 130 to which it is connected (e.g., the first access tunnel 170-1 between the VLAN server mobility switch 130-1 and the first access point 140-1) (213).

Peer mobility switches 130 receive the advertisements and elect mobility VLAN servers for a mobility VLAN 125 which is not mapped locally according to the advertised priority. In this manner, the roaming mobility switch 130-3 may determine which peer mobility switch should be queried for multicast connectivity for the roaming mobile unit 150 (e.g., as discussed above with regard to step 201 of FIG. 2). The roaming mobility switch 130-3 receives a report from the VLAN server mobility switch 130-1 acting as the VLAN server for the mobile unit 150 in the designated VLAN 120-1 over the mobility tunnel 160-1 constructed to the VLAN server mobility switch 130-1. The roaming mobility switch 130-3 then examines the report to identify the VLAN server mobility switch 130-1 as the VLAN server for the mobile unit 150. Finally, the roaming mobility switch 130-3 updates a mobility VLAN database (MVDB) to include an entry identifying the VLAN server mobility switch 130-1 as the VLAN server for the mobile unit 150.

A random weighted election method, referred to as VLAN Server Election (VSE), is used to load balance when more than one server advertises for a mobility VLAN 125. In this method, a probability density function is computed from current advertised priority. The base Media Access Control (MAC) address is used as the seed for the random number generator. This ensures that, on average, the highest priority switch gets most remote mobility VLAN connections yet achieves load balancing. Peer mobility switches 130 maintain the current server and the list of alternative servers for a mobility VLAN 125. When a mobility switch 130 loses its connection with a mobility VLAN server, it switches to the next alternate mobility VLAN server in the list. This enhances reliability and allows mobile units to roam seamlessly within a mobility domain 100 and maintain membership within the original mobility VLAN 125. VSE and load balancing are discussed in further detail in copending U.S. patent application Ser. No. 12/773,267, filed May 4, 2010, which is herein incorporated by reference. Further, loop prevention among VLAN servers is discussed in detail in copending U.S. patent application Ser. No. 12/772,299, filed May 3, 2010, which is herein incorporated by reference.

Figure 4:
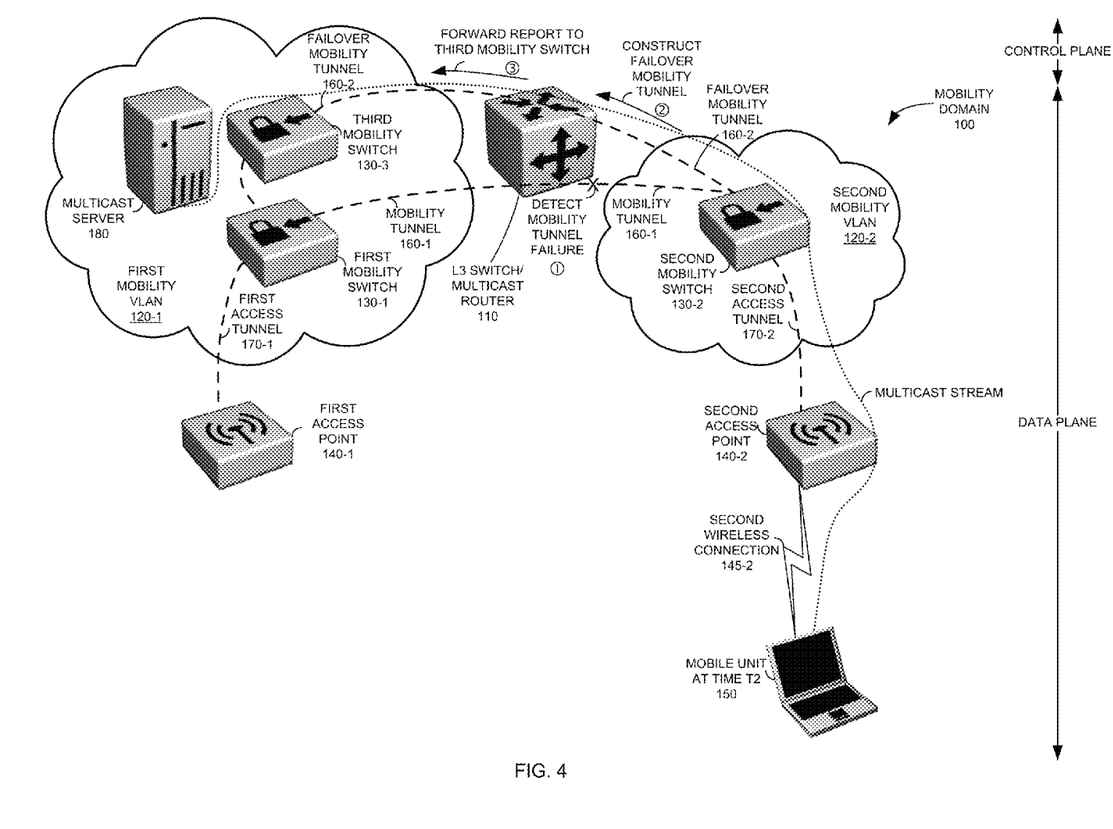
FIG. 4 is a diagram illustrating an example embodiment of the present invention showing seamless transfer of multicast connectivity provided in the roaming VLAN during a mobility tunnel failure.

FIG. 4 is a diagram illustrating an example embodiment of the present invention showing seamless transfer of multicast connectivity provided in the roaming VLAN 120-2 during a mobility tunnel failure. As illustrated in FIG. 4, the mobility tunnel 160-1 (i.e., the mobility tunnel constructed in FIG. 1) experiences a failure. This may be a failure of the mobility tunnel, itself, or of the VLAN server mobility switch 130-1. The example embodiment of FIG. 4 will be discussed further in conjunction with the flow diagram of FIG. 5.

Figure 5:
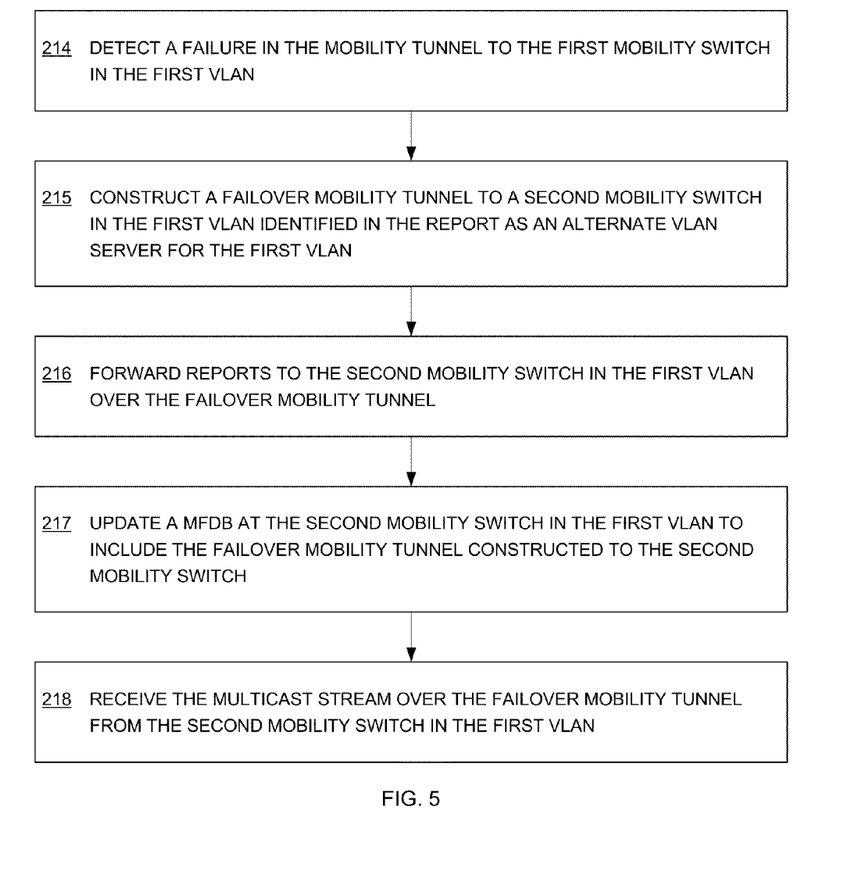
FIG. 5 is a flow diagram illustrating the steps performed by a mobility switch for providing seamless transfer of multicast connectivity provided in the roaming VLAN during a mobility tunnel failure.

FIG. 5 is a flow diagram illustrating the steps performed by the roaming mobility switch 130-3 for providing seamless multicast connectivity during a failure of the mobility tunnel 160-1. First the roaming mobility switch 130-3 detects the failure in the mobility tunnel 160-1 to the VLAN server mobility switch 130-1 (214). The roaming mobility switch 130-3 then constructs an alternate mobility tunnel 160-2 to an alternate VLAN server mobility switch 130-2 in the designated VLAN 120-1 identified in the report as an alternate VLAN server for the mobility VLAN 125 (215). Next, the roaming mobility switch 130-3 forwards reports to the alternate VLAN server mobility switch 130-2 over the alternate mobility tunnel 160-2 (216). The alternate VLAN server mobility switch 130-2 then updates a MFDB at the alternate VLAN server mobility switch 130-2 to include the alternate mobility tunnel 160-2 constructed to the roaming mobility switch 130-3 (217). Finally, the roaming mobility switch 130-3 receives the multicast stream over the alternate mobility tunnel 160-2 from the alternate VLAN server mobility switch 130-2 (218).

Server redundancy and failover are discussed in further detail in copending U.S. patent application Ser. No. 12/772, 424, filed May 3, 2010, which is herein incorporated by reference.

Figure 6:
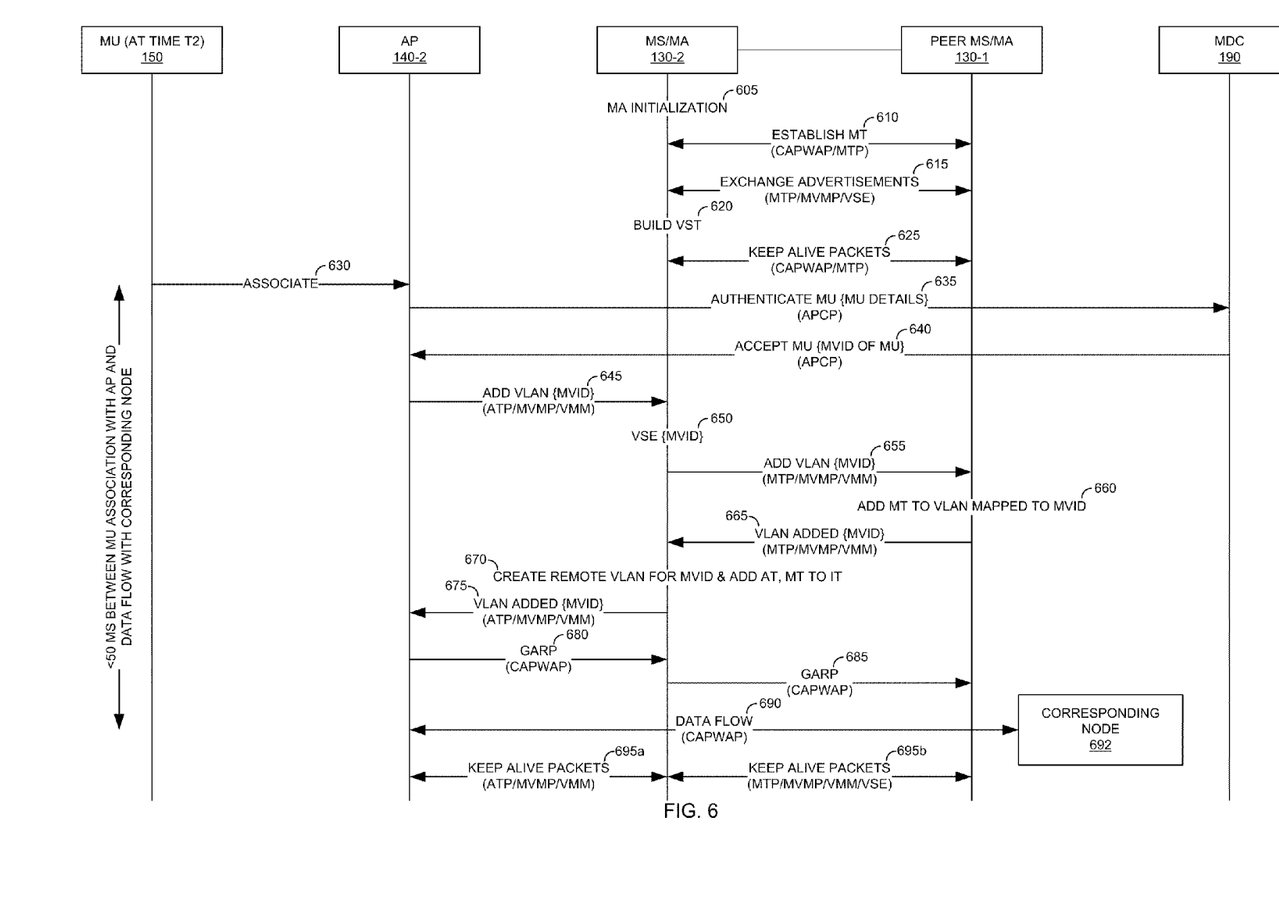
FIG. 6 is a flow diagram illustrating communications between mobile units, access points, mobility switches and mobility controllers, such as those shown in FIG. 1, according to a Mobility VLAN Management Protocol (MVMP).

FIG. 6 is a flow diagram illustrating communications between mobile units 150, access points 140, mobility switches 130 and mobility controllers 190, such as those shown in FIG. 1, according to a Mobility VLAN Management Protocol (MVMP). FIG. 6 will be discussed from the perspective of the roaming mobility switch 130-3 in FIG. 1 prior to and following the mobile unit 150 roaming from the server VLAN 120-1 to the roaming VLAN 120-2.

Initially, the roaming mobility switch 130-3 and mobility agent initialize (605). The roaming mobility switch 130-3 then establishes mobility tunnels 160-1, 160-2 with its peer mobility switches 130-1, 130-2, respectively, according to the CAPWAP and MTP protocols (610). This is repeated for all mobility switches 130 in the plurality of mobility switches, thereby resulting in a mesh of mobility tunnels 160 constructed among the plurality of mobility switches 130. Further, the mobility switches 130 exchange advertisements regarding which mobility VLANs 125 potentially may be served by those mobility switches 130 using the MTP and MVMP protocols (615). The mobility switches 130 also perform VLAN Server Election (VSE) as discussed above. Based on those advertisements, the roaming mobility switch 130-3 builds a VLAN Server Table (VST) for the roaming mobility switch 130-3 so that it knows which peer mobility switch(es) 130 has access to which mobility VLANs 125 (620). The mobility tunnels 160 are maintained using keep alive packets (i.e., periodic packets sent across the tunnel 160) (625).

When the mobile unit 150 associates with the second access point 140-2 at time T2 (630), the second access point 140-2 communicates this association directly to the mobility controller 190 to authenticate the mobile unit 150 (635). An Access Point Control Protocol (APCP) is used to authenticate the mobile unit 150 and, at the same time, establish its resources in acceptance of the mobile unit 150 (640). A response may include a notification that a Remote Authentication Dial In User Service (RADIUS) server for another mobility controller 190 recognizes the mobile unit 150 and resources to which the mobile unit 150 has access, and that the mobile unit 150 should be assigned to a particular mobility VLAN 125.

The second access point 140-2 then looks for a mobility switch 130 that already has access to the particular mobility VLAN 125 requested by or designated for the mobile unit 150. If the mobile unit 150 is new to the second access point 140-2 that does not have access to the particular mobility VLAN 125 (i.e., previously has never associated with this access point), then the second access point 140-2 will send an add VLAN request over the second access tunnel 170-2 to the roaming mobility switch 130-3 including the mobility VLAN ID (645). This is accomplished using the Access Tunnel Protocol (ATP) and the Mobility VLAN Management Protocol (MVMP) by way of a VLAN Membership Management (VMM) message.

The roaming mobility switch 130-3 will look up the VLAN server and perform VLAN Server Election (VSE) based on the VLAN ID (650). The roaming mobility switch 130-3 then looks in a server table to determine if the server VLAN 120-1 is available locally, or on a remote mobility switch. In this particular example, the roaming mobility switch 130-3 determines that the mobility VLAN 125 is available on a peer mobility switch (i.e., the VLAN server mobility switch 130-1) and that this is a mobility VLAN 125 to which the roaming mobility switch 130-3 does not yet have access. The roaming mobility switch 130-3 sends an add VLAN request to the peer mobility switch (i.e., the VLAN server mobility switch 130-1) using the Mobility Tunnel Protocol and Mobility VLAN Management Protocol (MVMP) by way of a VLAN Membership Management (VMM) message (655).

The VLAN server mobility switch 130-1 will look at its server table and determine that it has access to the server VLAN 120-1 locally. Thus, the VLAN server mobility switch 130-1 adds the mobility tunnel 160-1 through which the VMM message came to the server VLAN 120-1 which is locally present according to the MVID (660). The VLAN server mobility switch 130-1 adds this membership by modifying its VLAN membership table and sends a message back to the same mobility tunnel, such that a response comes back to the mobility switch saying that the VLAN is added using the Mobility Tunnel Protocol and Mobility VLAN Management Protocol (MVMP) by way of a VLAN Membership Management (VMM) message (665).

At this point the roaming mobility switch 130-3 creates a remote VLAN, which is a temporary VLAN created dynamically by the roaming mobility switch 130-3, and connects the second access tunnel 170-2 and the mobility tunnel 160-1 to that temporary VLAN (670). The roaming mobility switch 130-3 then sends a response back to the second access point 140-2 indicating that the mobility VLAN 125 has been added (675). This happens only once per mobility VLAN 125. When another mobile unit comes to the roaming VLAN 120-2 on the second access point 140-2, a reference count is incremented at the second access point 140-2 and not propagated to the mobility switches 130, so that management becomes an operation local to the access points 140 such that mobility VLAN memberships are managed at the access points 140.

Once VLAN memberships are established, access points 140 will send out a learning frame through all tunnels (680) according to the Gratuitous Address Resolution Protocol (GARP). This message informs the rest of the switches that mobile unit 150 is available, according to its Media Access Control (MAC) address, on particular VLAN ports, on special ports, or on physical ports, and where the mobility VLAN is mapped to the physical world (685). This is required only for outbound traffic. If there is some traffic coming down to the mobile unit 150, the traffic must reach the correct mobility switch 130. Accordingly, the mobility switches 130 advertise which mobile units 150 they serve. Finally, the mobile unit 150 may exchange data at time T2 in the roaming VLAN 120-2 with a corresponding node 692 with which it was exchanging data at time T1 in the designated VLAN 120-1 (690). In a preferred embodiment, less than 50 ms transpire from the time the mobile unit 150 associates with the second access point 140-2 to when the data flow with the corresponding node 692 commences. At times when there is no data flow between the second access point 140-2 and the roaming mobility switch 130-3, and between the roaming mobility switch 130-3 and the VLAN server mobility switch (i.e., peer mobility switch) 130-1, keep alive packets may be sent to preserve the second access tunnel 170-2 and the mobility tunnel 160-1, respectively (695*a*, 695*b*).

Figure 7:
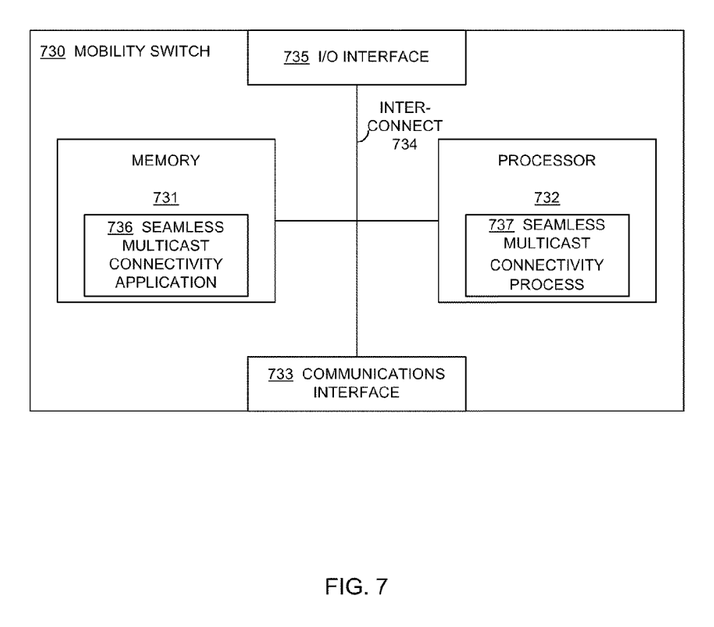
FIG. 7 is a block diagram illustrating an example embodiment apparatus of the present invention.

FIG. 7 is a block diagram illustrating an example architecture of a mobility switch (e.g., VLAN server mobility switch 130 of FIG. 1) 730 that executes, runs, interprets, operates or otherwise performs a seamless multicast connectivity application 736 in a seamless multicast connectivity process 737 suitable for use in explaining example configurations disclosed herein. As shown in this example, the mobility switch 730 includes a memory 731 encoded with the seamless multicast connectivity application 736 and a processor 732 on which the seamless multicast connectivity process 737 runs. Further, a communications interface 733 and an input/output (I/O) interface 735 are provided, with an interconnection mechanism 734, such as a data bus or other circuitry, that couples the memory 731, the processor 732, the communications interface 733 and the I/O interface 734. The communications interface 733 enables the mobility switch 730 to communicate with other devices (e.g., access points and other mobility switches) on a network (not shown).

The memory 731 is any type of computer readable medium and, in this example, is encoded with a seamless multicast connectivity application 736 as explained herein. The seamless multicast connectivity application 736 may be embodied as software code such as data and/or logic instructions (e.g., code stored in the memory or on another computer readable medium such as a removable disk) that supports processing functionality according to different embodiments described herein. During operation of the mobility switch 730, the processor 732 accesses the memory 731 via the interconnect 734 in order to launch, run, execute, interpret or otherwise perform the logic instructions of the seamless multicast connectivity application 736. Execution of the seamless multicast connectivity application 736 in this manner produces processing functionality in the seamless multicast connectivity process 737. In other words, the seamless multicast connectivity process 737 represents one or more portions or runtime instances of the seamless multicast connectivity application 736 (or the entire seamless multicast connectivity application 736) performing or executing within or upon the processor 732 in the mobility switch 730 at runtime.

It is noted that example configurations disclosed herein include the seamless multicast connectivity application 736, itself (i.e., in form of un-executed or non-performing logic instructions and/or data). The seamless multicast connectivity application 736 may be stored on a computer readable medium (e.g., a floppy disk, hard disk, electronic, magnetic, optical, or other computer readable medium). A seamless multicast connectivity application 736 may also be stored in a memory 731 such as in firmware, read only memory (ROM), or, as in this example, as executable code in, for example, Random Access Memory (RAM). In addition to these embodiments, it should also be noted that other embodiments herein include the execution of a seamless multicast connectivity application 736 in the processor 732 as the seamless multicast connectivity process 737. Those skilled in the art will understand that the mobility switch 730 may include other processes and/or software and hardware components, such as an operating system not shown in this example.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor," or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the Internet, as well as a virtual network. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Many modifications and variations may become apparent in light of the above teachings. Many additional changes in the details, materials, and arrangement of parts, herein described and illustrated, may be made by those skilled in the art.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A method for seamless Internet Protocol (IP) multicast stream transfer, the method comprising:
   receiving a report identifying a roaming mobile unit that has roamed from a first Virtual Local Area Network (VLAN) to a second VLAN, the report further identifying the first VLAN as a VLAN that the roaming mobile unit has roamed from, the roaming mobile unit being a member of a mobility VLAN, the roaming mobile unit receiving a multicast stream as part of a multicast group from a multicast server in the mobility VLAN;
   updating a first multicast forwarding database (MFDB) to include an entry for the roaming mobile unit;
   forwarding the report to a first mobility switch in the first VLAN over a mobility tunnel constructed to the first mobility switch in the first VLAN;
   said first mobility switch updating a second MFDB at the VLAN server mobility switch to include said mobility tunnel constructed to the VLAN server mobility switch and forwarding the report from the VLAN server mobility switch to a multicast router in the mobility VLAN;
   receiving the multicast stream over the mobility tunnel from the first mobility switch in the first VLAN; and
   forwarding the multicast stream toward the roaming mobile unit in the second VLAN so that transfer of the multicast stream from the first VLAN to the second VLAN is seamless.

2. The method of claim 1 wherein forwarding the multicast stream toward the roaming mobile unit in the second VLAN further comprises forwarding the multicast stream to an access point in the second VLAN over an access tunnel constructed to the access point in the second VLAN.

3. The method of claim 1 further comprising, in a plurality of mobility switches, for each mobility switch in the plurality of mobility switches, constructing a mobility tunnel to each other mobility switch in the plurality of mobility switch such that each mobility switch is connected to each respective other mobility switch in form of a mesh network of mobility tunnels.

4. The method of claim 3 further comprising, for a mobility switch in the plurality of mobility switches, in response to advertisements broadcast on the mesh network of mobility tunnels identifying mobility switches as VLAN servers for respective VLANs, recording each respective other mobility switch in the plurality of mobility switches as a potential VLAN server in its respective VLAN.

5. The method of claim 3 further comprising, for an access point connected to a mobility switch in the plurality of mobility switches, constructing an access tunnel between the access point and the mobility switch.

6. The method of claim 1 wherein said report comprises an Internet Group Management Protocol (IGMP) report.

7. The method of claim 1 further comprising:
   receiving query messages generated by the first mobility switch in the first VLAN through the mobility tunnel constructed to the first mobility switch in the first VLAN; and forwarding the query messages to an access point in the second VLAN.

8. The method of claim 1 further comprising:
   detecting a failure in the mobility tunnel to the first mobility switch in the first VLAN;
   constructing a failover mobility tunnel to a second mobility switch in the first VLAN identified in the report as an alternate VLAN server for the first VLAN;
   forwarding reports to the second mobility switch in the first VLAN over the failover mobility tunnel;
   updating a third MFDB at the second mobility switch in the first VLAN to include the failover mobility tunnel constructed to the second mobility switch; and
   receiving the multicast stream over the failover mobility tunnel from the second mobility switch in the first VLAN.

9. A computerized device for seamless Internet Protocol (IP) multicast stream transfer, the computerized device comprising:
   a memory;
   a processor;
   an interconnection mechanism coupling the memory and the processor;
   wherein the memory stores instructions that when executed on the processor causes the processor to:
   receive a report from a first Access Point (AP) in reply to a query from said first AP in response to a request from a roaming mobile unit to associate with said first AP, said report identifying a roaming mobile unit that has roamed from a first Virtual Local Area Network (VLAN) to a second
   VLAN, the report further identifying the first VLAN as a VLAN that the roaming mobile unit has roamed from, the roaming mobile unit being a member of a mobility Virtual Local Area Network (VLAN), the roaming mobile unit receiving a multicast stream as part of a multicast group from a multicast server in the mobility VLAN;
   updating a first multicast forwarding database (MFDB) to include an entry for the roaming mobile unit;

forward the report to a first mobility switch in the first VLAN over a mobility tunnel constructed to the first mobility switch in the first VLAN;

said first mobility switch updating a second MFDB at the VLAN server mobility switch to include said mobility tunnel constructed to the VLAN server mobility switch and forwarding the report from the VLAN server mobility switch to a multicast router in the mobility VLAN;

receive the multicast stream over the mobility tunnel from the first mobility switch in the first VLAN; and forward the multicast stream toward the roaming mobile unit in the second VLAN so that transfer of the multicast stream from the first VLAN to the second VLAN is seamless.

10. The computerized device of claim 9 wherein the memory further stores instructions that when executed by the processor causes the processor to:

forward the multicast stream to an access point in the second VLAN over an access tunnel constructed to the access point in the second VLAN.

11. The computerized device of claim 9 wherein the memory further stores instructions that when executed by the processor causes the processor to:

in a plurality of mobility switches, for each mobility switch, construct a mobility tunnel to each other mobility switch in the plurality of mobility switches such that each mobility switch is connected to each respective other mobility switch in form of a mesh network of mobility tunnels.

12. The computerized device of claim 11 wherein the memory further stores instructions that when executed by the processor causes the processor to:

identify mobility switches in the plurality of mobility switches as VLAN servers for respective VLANs; and record each respective other mobility switch in the plurality of mobility switches as a potential VLAN server in its respective VLAN.

13. The computerized device of claim 11 wherein the memory further stores instructions that when executed by the processor causes the processor to:

construct an access tunnel between an access point and a mobility switch in the plurality of mobility switches.

14. The computerized device of claim 9 wherein said report comprises an Internet Group Management Protocol (IGMP) report.

15. The computerized device of claim 9 wherein the memory further stores instructions that when executed by the processor causes the processor to:

receive query messages generated by the first mobility switch in the first VLAN through the mobility tunnel constructed to the first mobility switch in the first VLAN; and forward the query messages to an access point in the second VLAN.

16. The computerized device of claim 9 wherein the memory further stores instructions that when executed by the processor causes the processor to:

detect a failure in the mobility tunnel to the first mobility switch in the first VLAN;

construct a failover mobility tunnel to a second mobility switch in the first VLAN identified in the report as an alternate VLAN server for the first VLAN;

forward reports to the second mobility switch in the first VLAN over the failover mobility tunnel;

update a third MFDB at the second mobility switch in the first VLAN to include the failover mobility tunnel constructed to the second mobility switch; and receive the multicast stream over the failover mobility tunnel from the second mobility switch in the first VLAN.

17. A non-transitory computer readable medium encoded with computer programming logic that when executed on a processor in a computerized device provides seamless Internet Protocol (IP) multicast stream transfer, the computer readable medium comprising:

instructions for receiving a report from a first Access Point (AP) in reply to a query from said first AP in response to a request from a roaming mobile unit to associated with said first AP, said report identifying a roaming mobile unit that has roamed from a first Virtual Local Area Network (VLAN) to a second VLAN, the report further identifying the first VLAN as a VLAN that the roaming mobile unit has roamed from, the roaming mobile unit being member of a mobility VLAN, the roaming mobile unit receiving a multicast stream as part of a multicast group from a multicast server in the mobility VLAN;

instructions for updating a first multicast forwarding database (MFDB) to include an entry for the roaming mobile unit;

instructions for forwarding the report to a first mobility switch in the first VLAN over a mobility tunnel constructed to the first mobility switch in the first VLAN;

said first mobility switch updating a second MFDB at the VLAN server mobility switch to include said mobility tunnel constructed to the VLAN server mobility switch and forwarding the report from the VLAN server mobility switch to a multicast router in the mobility VLAN;

instructions for receiving the multicast stream over the mobility tunnel from the first mobility switch in the first VLAN; and instructions for forwarding the multicast stream toward the roaming mobile unit in the second VLAN so that transfer of the multicast stream from the first VLAN to the second VLAN is seamless.

18. The computer readable medium of claim 17 wherein said report comprises an Internet Group Management Protocol (IGMP) report.

* * * * *